(12) United States Patent
Kamangu

(10) Patent No.: US 11,516,441 B1
(45) Date of Patent: Nov. 29, 2022

(54) 360 DEGREE VIDEO RECORDING AND PLAYBACK DEVICE

(71) Applicant: Kanya Kamangu, Fayetteville, GA (US)

(72) Inventor: Kanya Kamangu, Fayetteville, GA (US)

( * ) Notice: Subject to any disclaimer, the term of this patent is extended or adjusted under 35 U.S.C. 154(b) by 29 days.

(21) Appl. No.: 17/202,417

(22) Filed: Mar. 16, 2021

(51) Int. Cl.
| | |
|---|---|
| *H04N 7/18* | (2006.01) |
| *H04N 5/77* | (2006.01) |
| *H04N 5/232* | (2006.01) |
| *H04N 5/225* | (2006.01) |

(52) U.S. Cl.
CPC .......... *H04N 7/183* (2013.01); *H04N 5/2252* (2013.01); *H04N 5/23238* (2013.01); *H04N 5/77* (2013.01)

(58) Field of Classification Search
CPC ................. H04N 7/183; H04N 5/2252; H04N 5/23238; H04N 5/77
See application file for complete search history.

(56) References Cited

U.S. PATENT DOCUMENTS

| | | | |
|---|---|---|---|
| 7,542,668 B2 | 6/2009 | Minoru | |
| 7,884,848 B2 | 2/2011 | Ginther | |
| 7,952,777 B2 | 5/2011 | Nishiwaki | |
| D768,588 S | 10/2016 | Adhia | |
| 10,129,512 B2 | 11/2018 | Esrail | |
| 10,447,993 B2 | 10/2019 | Nelson | |
| 2014/0015981 A1* | 1/2014 | Dietl | G08B 13/19632 348/159 |
| 2014/0333775 A1* | 11/2014 | Naikal | H04N 21/44008 348/159 |
| 2015/0341555 A1 | 11/2015 | Artonne | |
| 2016/0092735 A1* | 3/2016 | Govil | G06V 10/462 382/103 |
| 2016/0316249 A1* | 10/2016 | Smith | H04N 21/4223 |
| 2017/0048455 A1 | 2/2017 | Brand | |
| 2017/0339341 A1* | 11/2017 | Zhou | H04N 5/23238 |
| 2020/0169659 A1* | 5/2020 | Abbas | H04N 5/23296 |

FOREIGN PATENT DOCUMENTS

WO 2017062865 4/2017

\* cited by examiner

*Primary Examiner* — Sunghyoun Park
(74) *Attorney, Agent, or Firm* — Kyle A. Fletcher, Esq.

(57) ABSTRACT

The 360 degree video recording and playback device is a security device. The 360 degree video recording and playback device is an audio-video recording device. The 360 degree video recording and playback device incorporates an image capture structure, a rendering structure, a supervisory structure, and a housing. The housing contains the image capture structure, the rendering structure, and the supervisory structure. The image capture structure, the rendering structure, and the supervisory structure are electrically interconnected. The image captures structure is a recording device that captures audible sounds and video images from the vicinity surrounding the 360 degree video recording and playback device. The field of view of the captured video images is 360 degrees. The rendering structure converts the captured audible sounds and video images into one or more video files.

14 Claims, 3 Drawing Sheets

360 DEGREE VIDEO RECORDING AND PLAYBACK DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pictorial communication and video capture, more specifically, an electric circuit for the capture and recording of a video image. (H04N5/772)

SUMMARY OF INVENTION

The 360 degree video recording and playback device is a security device. The 360 degree video recording and playback device is an audio-video recording device. The 360 degree video recording and playback device comprises an image capture structure, a rendering structure, a supervisory structure, and a housing. The housing contains the image capture structure, the rendering structure, and the supervisory structure. The image capture structure, the rendering structure, and the supervisory structure are electrically interconnected. The image captures structure is a recording device that captures audible sounds and video images from the vicinity surrounding the 360 degree video recording and playback device. The field of view of the captured video images is 360 degrees. The rendering structure converts the captured audible sounds and video images into one or more video files. The supervisory structure monitors the one or more video files for security threats. The supervisory structure takes appropriate action when a threat is detected.

These together with additional objects, features and advantages of the 360 degree video recording and playback device will be readily apparent to those of ordinary skill in the art upon reading the following detailed description of the presently preferred, but nonetheless illustrative, embodiments when taken in conjunction with the accompanying drawings.

In this respect, before explaining the current embodiments of the 360 degree video recording and playback device in detail, it is to be understood that the 360 degree video recording and playback device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the 360 degree video recording and playback device.

It is therefore important that the claims be regarded as including such equivalent construction insofar as they do not depart from the spirit and scope of the 360 degree video recording and playback device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
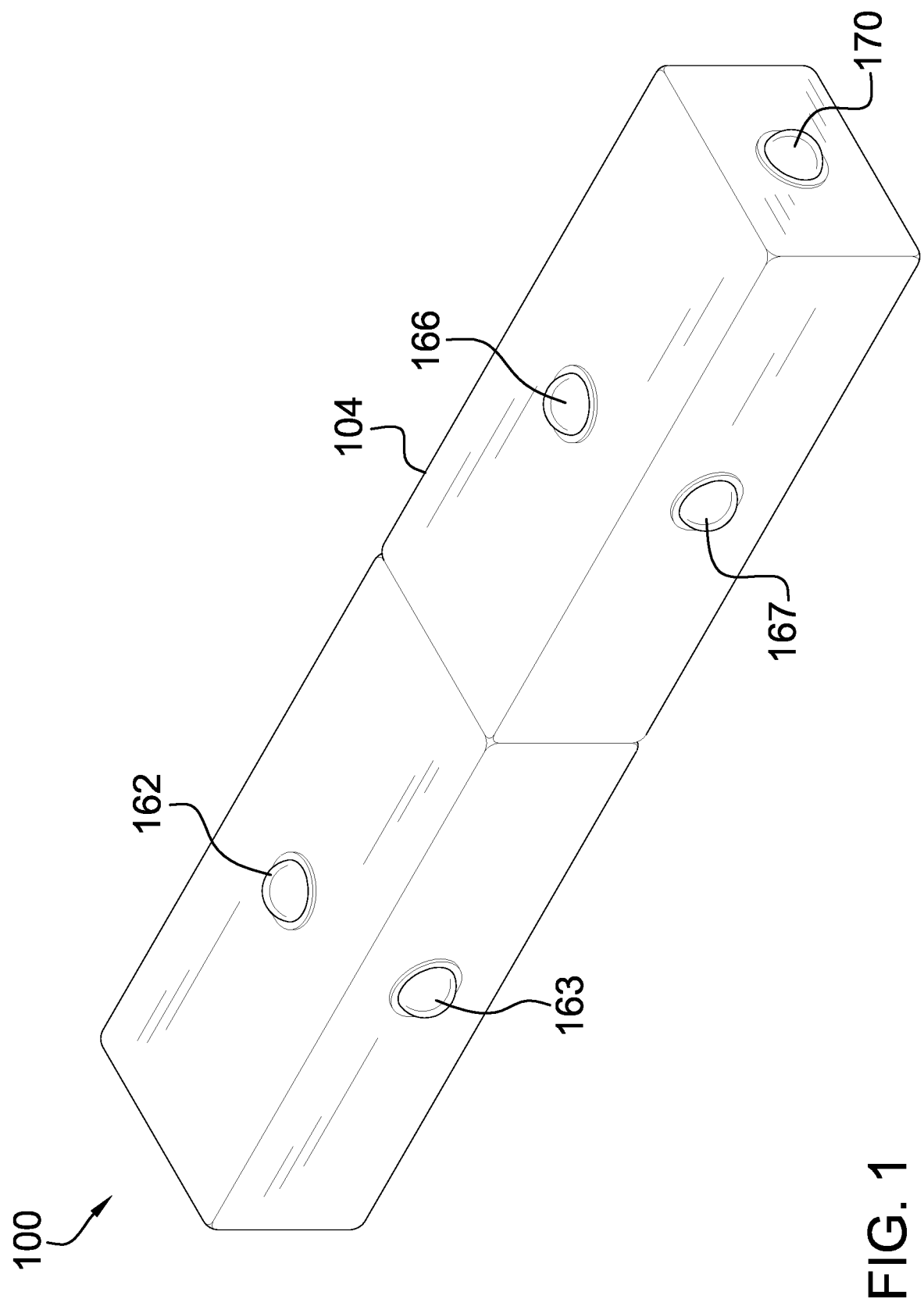
FIG. 1 is a perspective view of an embodiment of the disclosure.
Figure 2:
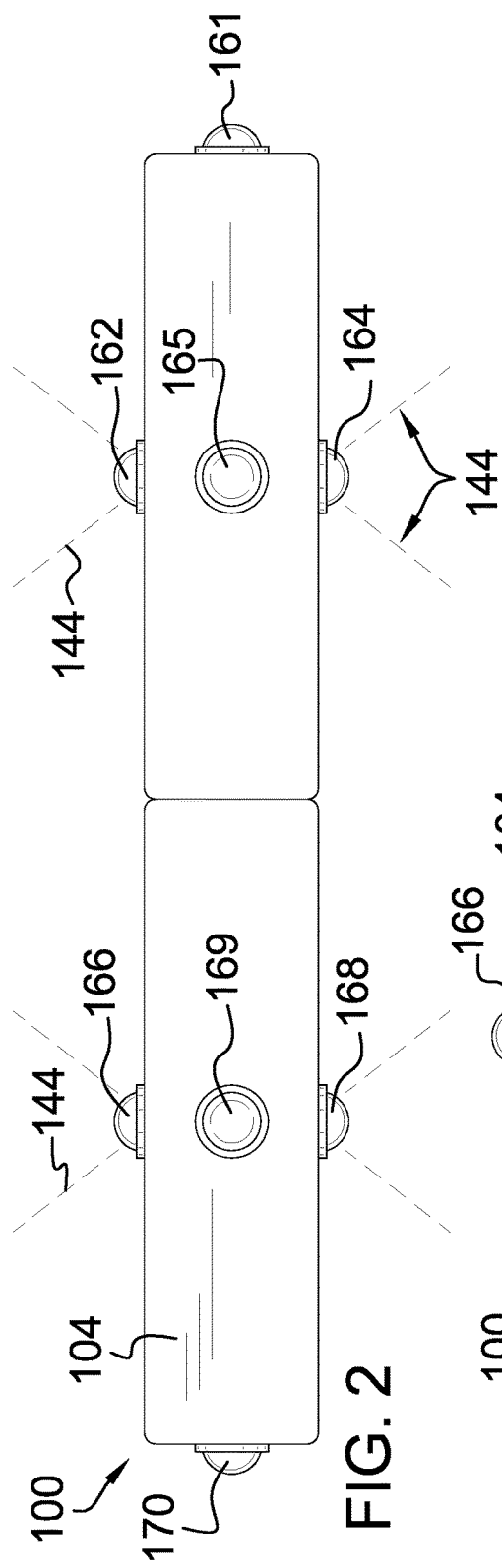
FIG. 2 is a front view of an embodiment of the disclosure.
Figure 3:
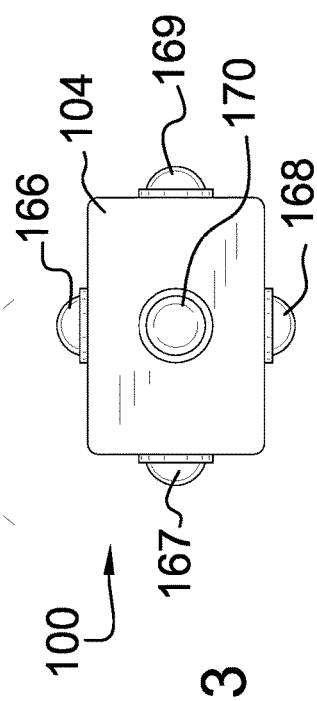
FIG. 3 is a side view of an embodiment of the disclosure.
Figure 4:
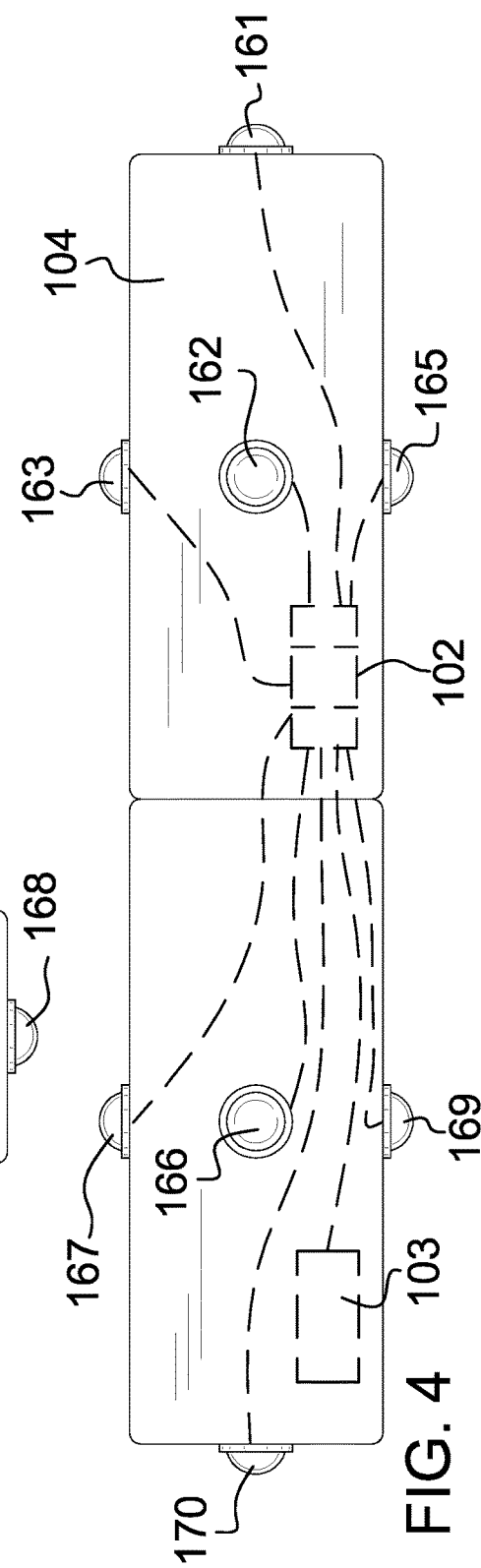
FIG. 4 is a top view of an embodiment of the disclosure.
Figure 5:
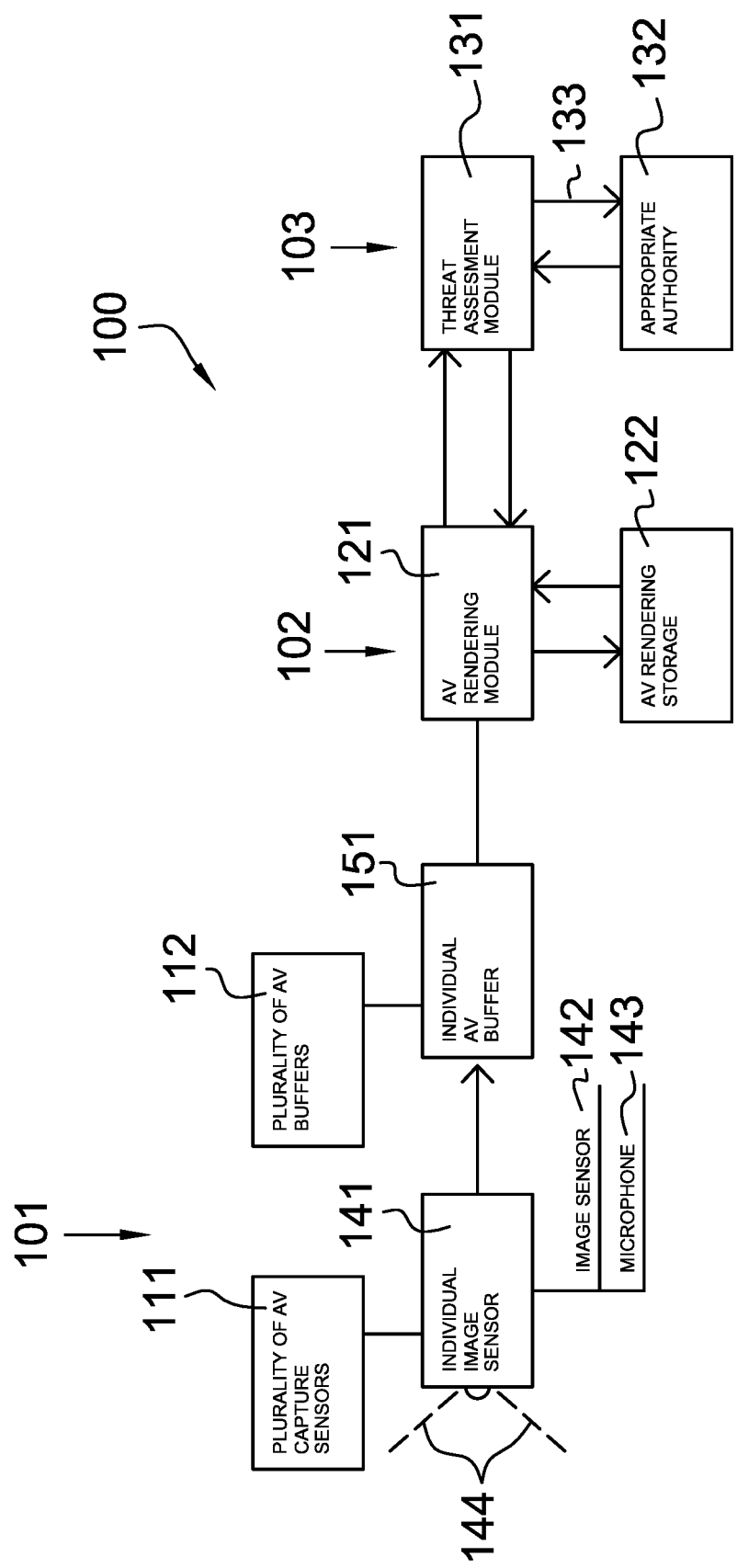
FIG. 5 is a schematic view of an embodiment of the disclosure.

Detailed reference will now be made to one or more potential embodiments of the disclosure, which are illustrated in FIGS. 1 through 5.

The 360 degree video recording and playback device 100 (hereinafter invention) is a security device. The invention 100 is an audio-video recording device. The invention 100 comprises an image capture structure 101, a rendering structure 102, a supervisory structure 103, and a housing 104. The housing 104 contains the image capture structure 101, the rendering structure 102, and the supervisory structure 103. The image capture structure 101, the rendering structure 102, and the supervisory structure 103 are electrically interconnected. The image captures structure is a recording device that captures audible sounds and video images from the vicinity surrounding the invention 100. The field of view 144 of the captured video images is 360 degrees. The rendering structure 102 converts the captured audible sounds and video images into one or more video files. The supervisory structure 103 monitors the one or more video files for security threats. The supervisory structure 103 takes appropriate action when a threat is detected.

The housing 104 is a rigid structure. The housing 104 contains the image capture structure 101, the rendering structure 102, and the supervisory structure 103. The housing 104 is formed with all apertures and form factors necessary to allow the housing 104 to accommodate the use and operation of the invention 100. Methods to form a housing 104 suitable for the purposes described in this disclosure are well-known and documented in the mechanical arts.

The image capture structure 101 is a sensor. The image capture structure 101 captures images in the vicinity of the invention 100. The image capture structure 101 captures audible sounds in the vicinity of the invention 100. The image capture structure 101 converts the captured visual images into electrical signals that are transmitted to the rendering structure 102. The image capture structure 101 converts the captured audible sounds into electrical signals that are transmitted to the rendering structure 102. The field of view 144 of the image capture structure 101 is 360 degrees around every axis through the invention 100. The 360 degree field of view means that there are no blind spots in the images that are captured by the image capture structure 101. The image capture structure 101 comprises a plurality of audio-visual capture structures 111 and a plurality of audio-visual buffers 112.

Each of the plurality of audio-visual capture structures 111 is a sensor. Each of the plurality of audio-visual capture structures 111 captures audible sounds from the vicinity of the invention 100. Each of the plurality of audio-visual capture structures 111 converts the captured audible sounds into an electrical signal that is transmitted to an individual AV buffer 151 selected from the plurality of audio-visual buffers 112. Each of the plurality of audio-visual capture structures 111 captures video images from the vicinity of the invention 100. Each of the plurality of audio-visual capture structures 111 converts the captured video images into an electrical signal that is transmitted to an individual AV buffer 151 selected from the plurality of audio-visual buffers 112.

The plurality of audio-visual capture structures 111 comprises a collection of individual AV capture sensors 141. The individual AV capture sensor 141 is a sensor. The individual AV capture sensor 141 captures images in the vicinity of the invention 100 and transmits the captured image as an electric signal to the individual AV buffer 151 associated with the individual AV capture sensor 141. The individual AV capture sensor 141 captures audible sounds from the vicinity of the invention 100 and transmits the captured audible sounds as an electric signal to the individual AV buffer 151 associated with the individual AV capture sensor 141. Each individual AV capture sensor 141 comprises an image sensor 142 and a microphone 143.

The image sensor 142 is used with the AV rendering module 121. The image sensor 142 receives light from within a field of view 144 of the exterior of the image sensor 142 and converts the received light into a digital representation of sufficient detail to allow the AV rendering module 121 to create a video file that can be used by the supervisory structure 103 to display a visual reproduction of the source of the captured light. The field of view 144 is defined elsewhere in this disclosure.

The microphone 143 is a transducer. The microphone 143 converts audible sounds captured in the vicinity of the invention 100 and converts the captured sounds into electric signals that are transmitted to the individual AV buffer 151 associated with the individual AV capture sensor 141.

Each of the plurality of audio-visual buffers 112 is a buffer. The plurality of audio-visual buffers 112 comprises a collection of individual AV buffers 151. There is a one to one correspondence between each individual AV buffer 151 selected from the plurality of audio-visual buffers 112 and an individual AV capture sensor 141 selected from the plurality of audio-visual capture structures 111. Each of the plurality of audio-visual buffers 112 electrically connects to the rendering structure 102. The individual AV buffer 151 electrically connects to the individual AV capture sensor 141 associated with the individual AV buffer 151.

Each individual AV buffer 151 selected from the plurality of audio-visual buffers 112 receives the electrical signals generated from the audible sounds and the video images that were captured by the individual AV capture sensor 141 associated with the individual AV buffer 151. Each individual AV buffer 151 selected from the plurality of audio-visual buffers 112 is a memory device that stores the electrical signals until the rendering structure 102 is ready to receive data from the individual AV buffer 151. Each individual AV buffer 151 transmits the stored electrical signals to the rendering structure 102.

The rendering structure 102 is an electrical device. The rendering structure 102 receives the electrical signals of the captured visual images that were transmitted from the image capture structure 101. The rendering structure 102 receives the electrical signals of the captured audible sounds that were transmitted from the image capture structure 101. The rendering structure 102 converts the received electrical signals into a plurality of video files. The rendering structure 102 stores each of the plurality of video files in a memory device. The rendering structure 102 transmits each of the plurality of video files to the supervisory structure 103. The rendering structure 102 comprises an AV rendering module 121 and an AV rendering storage 122. The AV rendering storage 122 electrically connects to the AV rendering module 121.

The AV rendering module 121 is an electrical device. The AV rendering module 121 electrically connects to each individual AV buffer 151 selected from the plurality of audio-visual buffers 112. The AV rendering module 121 receives the electric signal from each individual AV buffer 151 that encodes the video images captured by the individual AV capture sensor 141 that is associated with the individual AV buffer 151. The AV rendering module 121 receives the electric signal from each individual AV buffer 151 that encodes the audible sounds captured by the individual AV capture sensor 141 that is associated with the individual AV buffer 151. The AV rendering module 121 combines the received electric signals into a single video file. The AV rendering module 121 transmits the combined video file to the supervisory structure 103. The AV rendering module 121 transmits the combined video file to the AV rendering storage 122 for storage.

The AV rendering storage 122 is a memory device. The AV rendering storage 122 electrically connects to the AV rendering module 121. The AV rendering storage 122 receives each video file generated by the AV rendering module 121. The AV rendering storage 122 stores each video file generated by the AV rendering module 121 for future use.

The supervisory structure 103 is an electrical device. The supervisory structure 103 receives the plurality of video files generated by the rendering structure 102. The supervisory structure 103 assesses each of the plurality of video files for a potential threat. The supervisory structure 103 forms a communication link 133 with the appropriate authority 132. When the supervisory structure 103 detects a potential threat, the supervisory structure 103 forwards this information to the appropriate authority 132 for further assessment. The supervisory structure 103 comprises a threat assessment module 131, an appropriate authority 132, and a communication link 133. The communication link 133 is a structure that exchanges data between the threat assessment module 131 and the appropriate authority 132.

The threat assessment module 131 is an artificially intelligent structure. The threat assessment module 131 receives each of the plurality of video files that are generated by the AV rendering module 121 of the rendering structure 102. The threat assessment module 131 analyzes each of the plurality of video files to assess any threats to security that might be in the vicinity of the invention 100. The threat assessment module 131 forms a communication link 133 with the appropriate authority 132. When the threat assessment module 131 detects a potential threat, the threat assessment module 131 transmits a message along with the appropriate video files to the appropriate authority 132 for further assessment and action. The appropriate authority 132 is defined elsewhere in this disclosure. The communication link 133 is defined elsewhere in this disclosure.

In the first potential embodiment of the disclosure, the plurality of audio-visual capture structures 111 comprises a first AV capture sensor 161, a second AV capture sensor 162, a third AV capture sensor 163, a fourth AV capture sensor 164, a fifth AV capture sensor 165 comprises a sixth AV capture sensor 166, a seventh AV capture sensor 167, an eighth AV capture sensor 168, a ninth AV capture sensor 169, and a tenth AV capture sensor 170.

The first AV capture sensor 161 mounts on the housing 104 such that the field of view 144 of the first AV capture sensor 161 overlaps with the fields of view 144 of the second AV capture sensor 162, the third AV capture sensor 163, the fourth AV capture sensor 164, and the fifth AV capture sensor 165.

The second AV capture sensor 162 mounts on the housing 104 such that the field of view 144 of the second AV capture sensor 162 overlaps with the fields of view 144 of the first AV capture sensor 161, the third AV capture sensor 163, the fifth AV capture sensor 165, and the sixth AV capture sensor 166.

The third AV capture sensor 163 mounts on the housing 104 such that the field of view 144 of the third AV capture sensor 163 overlaps with the fields of view 144 of the first AV capture sensor 161, the second AV capture sensor 162, the fourth AV capture sensor 164, and the seventh AV capture sensor 167.

The fourth AV capture sensor 164 mounts on the housing 104 such that the field of view 144 of the fourth AV capture sensor 164 overlaps with the fields of view 144 of the first AV capture sensor 161, the third AV capture sensor 163, the fifth AV capture sensor 165, and the eighth AV capture sensor 168.

The fifth AV capture sensor 165 mounts on the housing 104 such that the field of view 144 of the fifth AV capture sensor 165 overlaps with the fields of view 144 of the first AV capture sensor 161, the second AV capture sensor 162, the fourth AV capture sensor 164, and the ninth AV capture sensor 169.

The sixth AV capture sensor 166 mounts on the housing 104 such that the field of view 144 of the sixth AV capture sensor 166 overlaps with the fields of view 144 of the second AV capture sensor 162, the seventh AV capture sensor 167, the ninth AV capture sensor 169, and the tenth AV capture sensor 170.

The seventh AV capture sensor 167 mounts on the housing 104 such that the field of view 144 of the seventh AV capture sensor 167 overlaps with the fields of view 144 of the third AV capture sensor 163, the sixth AV capture sensor 166, the eighth AV capture sensor 168, and the tenth AV capture sensor 170.

The eighth AV capture sensor 168 mounts on the housing 104 such that the field of view 144 of the eighth AV capture sensor 168 overlaps with the fields of view 144 of the fourth AV capture sensor 164, the seventh AV capture sensor 167, the ninth AV capture sensor 169, and the tenth AV capture sensor 170.

The ninth AV capture sensor 169 mounts on the housing 104 such that the field of view 144 of the ninth AV capture sensor 169 overlaps with the fields of view 144 of the fifth AV capture sensor 165, the sixth AV capture sensor 166, the eighth AV capture sensor 168, and the tenth AV capture sensor 170.

The tenth AV capture sensor 170 mounts on the housing 104 such that the field of view 144 of the tenth AV capture sensor 170 overlaps with the fields of view 144 of the sixth AV capture sensor 166, the seventh AV capture sensor 167, the eighth AV capture sensor 168, and the ninth AV capture sensor 169.

The following definitions were used in this disclosure:

Appropriate Authority: As used in this disclosure, an appropriate authority is a previously determined person or organization that is designated to send and receive alarm or other notification messages regarding a monitored system or activity.

Artificial Intelligence Device: As used in this disclosure, an artificial intelligence refers to a device (AI device) that is configured to perform tasks in a manner that simulates human intelligence. By simulating human intelligence is meant that: a) the AI device is autonomous; b) is capable of receiving inputs from and generating outputs into an operating environment; c) that the received inputs are processed through a utility function; d) that the utility function generates the outputs; e) that the generated outputs of the utility function are optimized in some fashion (such as the use of a maximum likelihood function); and f) the utility function is modified over time through the use of a feedback mechanism (often referred to as training).

Audio-Visual Display: As used in this disclosure, an audio-visual display is a display device that further comprises a speaker such that the audio-visual display simultaneously presents visual and audible information in a coordinated manner.

Buffer: As used in this disclosure, a buffer is a device that allows two otherwise incompatible structures to work with each other. A buffer is often used to mediate timing issues between the incompatible structures.

Communication Link: As used in this disclosure, a communication link refers to the structured exchange of data between two objects.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Error Function: As used in this disclosure, an error function refers to a data structure that describes the difference between the actual result of a system and the expected results derived from a mechanical or mathematical model of the system.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Field of View: As used in this disclosure, a field of view refers to one or more angles which delimits an area from which electromagnetic radiation will be sensed by a person or an image sensor.

Form Factor: As used in this disclosure, the term form factor refers to the size and shape of an object.

Housing: As used in this disclosure, a housing is a rigid structure that encloses and protects one or more devices.

Image: As used in this disclosure, an image is an optical representation or reproduction of an indicia or of the appearance of something or someone. See indicia sentiment optical character recognition. See Label.

Image Sensor: As used in this disclosure, an image sensor receives light from the exterior of the image sensor and converts the received light into a digital representation of sufficient detail to allow a logic module to create and display a visual reproduction of the source of the captured light.

Lens: As used in this disclosure, a lens is a transparent substance through which electromagnetic radiation can pass. The lens refracts the electromagnetic radiation as it passes through the lens. A lens may or may not be formed with curved surfaces that are used to concentrate or disperse the electromagnetic radiation that travels through the lens. A lens can also project a focused image on a surface known as a virtual image. A lens may also be used to change the apparent size of the virtual image. A magnifying lens (also known as a magnifying glass) is a lens that increase the apparent size of a virtual image.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Microphone: As used in this disclosure, a microphone is a transducer that converts the energy from vibration into electrical energy. The sources of vibrations include, but are not limited to, acoustic energy.

Pattern Recognition Software: As used in this disclosure, pattern recognition software refers to a series of algorithms used to identify a pattern from a database of one or more previously captured and stored data structures. The captured data structure is assumed to be captured by a sensor. The pattern recognition software is often associated with artificial intelligence.

Recording Appliance: As used in this disclosure, a recording appliance is a device that captures a permanent record of an event selected from the group consisting of an audible event, a visual event, or a combination of an audible and visual event as the selected event occurs. The permanent record is used to present subsequent reproductions of the selected event. Recording appliances are commonly used to present these subsequent reproductions. Recording appliances are well-known, well documented, and commercially available. Recording devices are often electrical devices.

Rigid Structure: As used in this disclosure, a rigid structure is a solid structure formed from an inelastic material that resists changes in shape. A rigid structure will permanently deform as it fails under a force. See bimodal flexible structure.

Supervision: As used in this disclosure, supervision refers to an individual or system that observes and provides direction for the operation of: a) one or more individuals; or, b) a process.

Supervisory: As used in this disclosure, supervisory describes a relationship between a first object and a second object wherein the function of the first object is limited to initiating and monitoring the actions or activity of the second object. The first object is said to supervise the second object.

Transducer: As used in this disclosure, a transducer is a device that converts a physical quantity, such as pressure or brightness into an electrical signal or a device that converts an electrical signal into a physical quantity.

Vicinity: As used in this disclosure, vicinity refers to the space immediately, or closely, surrounding a first object. A second object is said to be in the vicinity of the first object.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

Video Device: As used in this disclosure, a video device is a device that generates an image on a display. The image may be a still or moving image.

Video File: As used in this disclosure, a video file is a digital representation of an image and associated audible sounds to store an image. Separate hardware is used to convert the digital representation of the sound into an audible sound.

Video Source: As used in this disclosure, a video source is a device that generates electrical signals that can be converted into an image by a display.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A security device comprising
an image capture structure, a rendering structure, a supervisory structure, and a housing;
wherein the housing contains the image capture structure, the rendering structure, and the supervisory structure;
wherein the image capture structure, the rendering structure, and the supervisory structure are electrically interconnected;
wherein the security device is an audio-video recording device;
wherein the image capture structure comprises a plurality of audio-visual capture structures and a plurality of audio-visual buffers;
wherein each of the plurality of audio-visual buffers is a buffer;
wherein the plurality of audio-visual buffers comprises a collection of individual AV buffers;
wherein there is a one to one correspondence between each individual AV buffer selected from the plurality of audio-visual buffers and an individual AV capture sensor selected from the plurality of audio-visual capture structures;
wherein each of the plurality of audio-visual buffers electrically connects to the rendering structure;
wherein the individual AV buffer electrically connects to the individual AV capture sensor associated with the individual AV buffer;
wherein each individual AV buffer selected from the plurality of audio-visual buffers receives the electrical signals generated from the audible sounds and the video images that were captured by the individual AV capture sensor associated with the individual AV buffer;
wherein each individual AV buffer selected from the plurality of audio-visual buffers is a memory device that stores the electrical signals until the rendering structure is ready to receive data from the individual AV buffer;
wherein each individual AV buffer transmits the stored electrical signals to the rendering structure.

2. The security device according to claim 1
wherein the image captures structure is a recording device that captures audible sounds and video images from the vicinity surrounding the security device;
wherein the field of view of the captured video images is 360 degrees;
wherein the rendering structure converts the captured audible sounds and video images into one or more video files;
wherein the supervisory structure monitors the one or more video files for security threats;
wherein the supervisory structure takes appropriate action when a threat is detected.

3. The security device according to claim 2
wherein the housing is a rigid structure;
wherein the housing contains the image capture structure, the rendering structure, and the supervisory structure.

4. The security device according to claim 3
wherein the image capture structure is a sensor;
wherein the image capture structure captures images in the vicinity of the security device;
wherein the image capture structure captures audible sounds in the vicinity of the security device;
wherein the image capture structure converts the captured visual images into electrical signals that are transmitted to the rendering structure;
wherein the image capture structure converts the captured audible sounds into electrical signals that are transmitted to the rendering structure.

5. The security device according to claim 4 wherein the field of view of the image capture structure is 360 degrees around every axis through the security device.

6. The security device according to claim 5
wherein the rendering structure is an electrical device;
wherein the rendering structure receives the electrical signals of the captured visual images that were transmitted from the image capture structure;
wherein the rendering structure receives the electrical signals of the captured audible sounds that were transmitted from the image capture structure;
wherein the rendering structure converts the received electrical signals into a plurality of video files;
wherein the rendering structure stores each of the plurality of video files in a memory device;
wherein the rendering structure transmits each of the plurality of video files to the supervisory structure.

7. The security device according to claim 6
wherein the supervisory structure is an electrical device;
wherein the supervisory structure receives the plurality of video files generated by the rendering structure;
wherein the supervisory structure assesses each of the plurality of video files for a potential threat.

8. The security device according to claim 7
wherein each of the plurality of audio-visual capture structures is a sensor;
wherein each of the plurality of audio-visual capture structures captures audible sounds from the vicinity of the security device;
wherein each of the plurality of audio-visual capture structures converts the captured audible sounds into an electrical signal that is transmitted to an individual AV buffer selected from the plurality of audio-visual buffers;
wherein each of the plurality of audio-visual capture structures captures video images from the vicinity of the security device;
wherein each of the plurality of audio-visual capture structures converts the captured video images into an electrical signal that is transmitted to an individual AV buffer selected from the plurality of audio-visual buffers.

9. The security device according to claim 8
wherein the rendering structure comprises an AV rendering module and an AV rendering storage;
wherein the AV rendering storage electrically connects to the AV rendering module.

10. The security device according to claim 9
wherein the plurality of audio-visual capture structures comprises a collection of individual AV capture sensors;
wherein the individual AV capture sensor is a sensor;
wherein the individual AV capture sensor captures images in the vicinity of the security device and transmits the captured image as an electric signal to the individual AV buffer associated with the individual AV capture sensor;
wherein the individual AV capture sensor captures audible sounds from the vicinity of the security device and transmits the captured audible sounds as an electric signal to the individual AV buffer associated with the individual AV capture sensor.

11. The security device according to claim 10
wherein each individual AV capture sensor comprises an image sensor and a microphone;
wherein the image sensor receives light from within a field of view of the exterior of the image sensor and converts the received light into a digital representation of sufficient detail to allow the AV rendering module to create a video file that can be used by the supervisory structure to display a visual reproduction of the source of the captured light;
wherein the microphone is a transducer;
wherein the microphone converts audible sounds captured in the vicinity of the security device and converts the captured sounds into electric signals that are transmitted to the individual AV buffer associated with the individual AV capture sensor.

12. The security device according to claim 11
wherein the AV rendering module is an electrical device;
wherein the AV rendering module electrically connects to each individual AV buffer selected from the plurality of audio-visual buffers;
wherein the AV rendering module receives the electric signal from each individual AV buffer that encodes the video images captured by the individual AV capture sensor that is associated with the individual AV buffer;
wherein the AV rendering module receives the electric signal from each individual AV buffer that encodes the audible sounds captured by the individual AV capture sensor that is associated with the individual AV buffer;
wherein the AV rendering module combines the received electric signals into a single video file;
wherein the AV rendering module transmits the combined video file to the supervisory structure;
wherein the AV rendering module transmits the combined video file to the AV rendering storage for storage.

13. The security device according to claim 12
wherein the AV rendering storage is a memory device;
wherein the AV rendering storage electrically connects to the AV rendering module;
wherein the AV rendering storage receives each video file generated by the AV rendering module;
wherein the AV rendering storage stores each video file generated by the AV rendering module.

14. The security device according to claim 13
wherein the supervisory structure comprises a threat assessment module, an appropriate authority, and a communication link;
wherein the communication link is a structure that exchanges data between the threat assessment module and the appropriate authority;
wherein the threat assessment module is an artificially intelligent structure;
wherein the threat assessment module receives each of the plurality of video files that are generated by the AV rendering module of the rendering structure;
wherein the threat assessment module analyzes each of the plurality of video files to assess any threats to security that might be in the vicinity of the security device;
wherein the threat assessment module forms a communication link with the appropriate authority;wherein when the threat assessment module detects a potential threat, the threat assessment module transmits a message along with the appropriate video files to the appropriate authority.

* * * * *